United States Patent [19]

Katayama et al.

[11] 4,076,951
[45] Feb. 28, 1978

[54] METHOD OF POLYMERIZING VINYL CHLORIDE

[75] Inventors: Kazuhiko Katayama, Kobe; Masahiko Nishigaki, Nishinomiya; Akira Ohtani, Kobe; Nobutaka Tani, Kobe; Minoru Nishizawa, Kobe; Hirokazu Nakanishi, Kobe, all of Japan

[73] Assignee: Kanegafuchi Kagaku Kogyo Kabushiki Kaisha, Osaka, Japan

[21] Appl. No.: 747,410

[22] Filed: Dec. 3, 1976

[30] Foreign Application Priority Data

Dec. 10, 1975 Japan .............................. 50-147863

[51] Int. Cl.² .......................... C08F 2/18; C08F 2/20; C08F 14/06
[52] U.S. Cl. ..................................................... 526/62
[58] Field of Search .......................................... 526/62

[56] References Cited

U.S. PATENT DOCUMENTS

| | | | |
|---|---|---|---|
| 3,507,849 | 4/1970 | Daues, Jr. | 526/62 |
| 3,669,946 | 6/1972 | Koyanagi et al. | 526/62 |
| 3,778,423 | 12/1973 | Reiter | 526/62 |

*Primary Examiner*—Alan Holler
*Attorney, Agent, or Firm*—Moonray Kojima

[57] ABSTRACT

In the suspension polymerization in an aqueous medium of vinyl chloride alone or of a monomer mixture comprising vinyl chloride as a major component and other monomers copolymerizable therewith as a minor component, depositin of polymer scales on the inside surfaces of the polymerization vessel is surprisingly prevented by coating the interior surface of the vessel and auxiliary equipment prior to the polymerization with at least one compound selected from the group consisting of hydroxyhydroquinone and pyrogallol.

12 Claims, No Drawings

METHOD OF POLYMERIZING VINYL CHLORIDE

BACKGROUND OF THE INVENTION

This invention relates to a method of suspension polymerization of vinyl chloride, and more particularly, to an improved method of substantially eliminating or reducing polymer scale adhesion on the inner surfaces of the polymerization vessel and auxiliary equipment used in combination therewith.

As used herein, the term "vinyl chloride" shall include vinyl chloride itself and also a monomeric mixture in which vinyl chloride forms a major component and other monomers copolymerizable therewith being a minor component.

Vinyl chloride is suspension polymerized on an industrial scale in an aqueous medium containing a suspension agent and an oil-soluble catalyst. The suspension polymerization of vinyl chloride is accompanied by deposition of polymer scales on the inner surfaces of the polymerization vessel and auxiliary equipment, such as agitation blades, baffle plates, and supply inlet, used in connection with the polymerization.

Polymer scales deposited on the inner surfaces of the polymerization vessel and auxiliary equipment decrease the efficiency of heat conduction of the vessel and equipment, decrease the polymer yield, and interfere with the properties of the polymer product since the scales peeled off from the surfaces of the vessel and equipment may become mixed with the polymer product. Moreover the scales which accumulate on the surfaces must be periodically removed; this incurs expenditure of time and labor and shutdown of the equipment for such scale removal. Accordingly, the plant cannot be efficiently utilized.

In an attempt to eliminate these deficiencies, different methods have been proposed for preventing scales from forming on the polymerization vessel walls and auxiliary equipment surfaces, such as, for example, the walls and surfaces have been coated with a variety of different compounds. In U.S. Pat. No. 3,669,946 there is disclosed a coating compound selected from the group consisting of nitrogen atom containing organic compounds, comprising azo radical containing compounds, nitro radical containing compounds, nitroso radical containing compounds, azomethine radical containing compounds, azine cyclic containing compounds and amines; sulfur atom containing organic compounds comprising thiocarbonyl radical containing compounds, thioether radical containing compounds and thioalcohol radical containing compounds; oxygen atom containing compounds comprising quinones, ketones, aldehydes, alcohols having at least six carbon atoms and carboxylic acids having at least six carbon atoms. U.S. Pat. No. 3,778,423 suggests use of a free radical inhibitor.

However, although the method of U.S. Pat. No. 3,669,946 can reduce the amount of scales adhering to the vessel surfaces, the reduction or prevention of scale deposition is not substantial and much more is necessary for the method to be industrially feasible. The method of U.S. Pat. No. 3,778,423 is deficient in that the polymerization velocity is decreased due to a large amount of free radical inhibitors being used; thus it is not always satisfactory. As is apparent from the foregoing discussion, a coating compound has not yet been discovered which substantially, economically and commercially and satisfactorily prevents deposition of polymer scales on the surfaces of the polymerization vessel and auxiliary equipment used in connection therewith.

SUMMARY OF THE INVENTION

An object of the present invention is to provide a method of suspension polymerizing vinyl chloride which substantially eliminates the above and other deficiencies of the prior art.

Another object of the invention is to provide a method of suspension polymerizing vinyl chloride in which the desired prevention of polymer scale deposition is unexpectedly achieved.

The foregoing and other objects of the invention are attained in the invention which encompasses the step of coating the interior walls of a polymerization vessel and auxiliary equipment used in connection therewith, with at least one compound selected from the group consisting of hydroxyhydroquinone and pyrogallol, prior to suspension polymerization of vinyl chloride in an aqueous medium. The coating compound may be used undiluted, or diluted with a suitable solvent such as water, methanol, ethanol, isopropanol and mixtures thereof and preferably water. The coating may be done by spraying, steeping or brushing. The amount of coating should be within the range of 1 mg/m$^2$ to 5 g/m$^2$.

A feature of the invention is the coating of the surfaces of the polymerization vessel and auxiliary equipment with hydroxyhydroquinone or pyrogallol, prior to suspension polymerization of vinyl chloride in an aqueous medium.

Other features of the invention are the amount of coating compound used being within the range of 1 mg/m$^2$ to 5 g/m$^2$; the coating compound being undiluted or diluted with a solvent such as water, methanol, ethanol, isopropanol, and mixtures thereof, and preferably water; and the application of the coating by such means as spraying, brushing or steeping.

DETAILED DESCRIPTION OF PREFERRED EMBODIMENTS

The foregoing and other objections, features and advantages of the present invention will become more apparent from the following detailed description.

After extensive study, the present inventors discovered a coating compound entirely different from those previously used in the prior art, which coating compound produces unexpectedly good and outstanding results in preventing polymer scale formation or deposition, and especially when compared with the results obtained by prior art methods.

The invention is characterized by coating the interior walls of the polymerization vessel and auxiliary equipment prior to suspension polymerization of vinyl chloride in an aqueous medium, with at least one compound selected from the group consisting of hydroxyhydroquinone and pyrogallol. The coating may be applied undiluted, or be diluted with a suitable solvent and then applied. Suitable solvents are those capable of dissolving the coating compound, such as water, methanol, ethanol, isopropanol, and mixtures thereof with water being preferred from the standpoint of safety. The coating may be applied by spraying, steeping or brushing.

Although it is not clearly understood why the inventive coating compounds prevent scale deposition, the following factors may partially explain the phenomena. Vinyl chloride is usually polymerized in a stainless steel polymerization vessel. During polymerization several active spots occur on the inner surfaces of the vessel and auxiliary equipment due to hydrochloric acid generation by the hydrogen chloride of polyvinyl chloride, whereupon the polymerization of vinyl chloride takes place to result in formation of polymer scales. The coating used in this invention, however, reacts with the active spots, thereby covering the active spots entirely. The polymerization of vinyl chloride on the active spots is thus avoided to reduce polymer scale adhesion.

The amount of compound used in the present invention must be sufficient to form a film on the entire surface being coated. This will be preferably in the range of from about 1 mg/m$^2$ to 5 g/m$^2$. In case the coating is less than 1 mg/m$^2$, polymer scales may deposit on the surfaces where the thin film fails to cover the above-mentioned active spots. The upper limit on the amount of compound applied is a practical limit rather than theoretical. As such, the upper limit amount can be greater than 5 g/m$^2$, unless an adverse effect occurs. On the whole, however, the use of amounts over such limit is not recommended since the degree of scale prevention is not proportional to the amount of compound used, and hence would not be economical.

Suspension agents and oil-soluble catalysts used in this invention for the suspension polymerization of vinyl chloride may be any known suspension agent and oil-soluble catalyst which are widely used. Suspension agents may include partially saponified polyvinyl acetate, polyacrylic acid, copolymers of maleic anhydride, cellulose derivatives, gelatin and mixtures thereof. Oil-soluble catalysts may include organic peroxides such as dibenzoyl peroxide, dilauroyl peroxide, diisopropyl peroxydicarbonate, dioctyl peroxydicarbonate, and acetylcyclohexylsulfonyl peroxide; and azo-compounds such as azobisisobutylonitrile and azobisdimethylvaleronitrile and mixtures thereof. The present invention is applicable not only to the polymerization of vinyl chloride, but also the copolymerization of a monomeric mixture comprising vinyl chloride as a major component and other monomers copolymerizable therewith as a minor component, such as about 60 to 100 weight percent vinyl chloride and about 40 to 0 weight percent other copolymerizable monomers.

The other copolymerizable monomers may include vinyl esters, such as vinyl acetate and vinyl propionate; vinyl ethers, such as methyl vinyl ether; esters of acrylic acid or methacrylic acid, such as methyl acrylate and methyl methacrylate; maleic acid or fumaric acid and anhydrides or esters thereof; olefines such as ethylene and propylene, halogenated olefines, such as vinylidene chloride, vinyl bromide and vinyl fluoride; nitrilic compounds such as acrylonitrile, and any other well known monomer.

In accordance with the present invention, prevention of polymer scale deposition is almost perfectly achieved without the accompanying decrease in polymerization velocity as was the case in the prior art. The interior walls, even after polymerization, retained their metal gloss. The present invention has further advantages, such as that there is no danger of coloring of the polymer product even if the coating compound is mixed into the polymer.

The present invention will be described in more detail hereinafter by way of actual examples, which examples are not to be construed in a manner to be limiting of the invention.

EXAMPLES 1-3

The surfaces of the interior walls of 1,000 liter stainless steel polymerization vessels were coated with an ethanol solution containing pyrogallol. Pyrogallol was thus applied on each inner wall of three polymerization vessels in amounts of 4.86 g/m$^2$, 3.28 g/m$^2$ and 0.13 g/m$^2$, respectively. After ethanol was removed by drying, 200 kg of vinyl chloride, 450 kg of pure water, 180 grams of partially saponified polyvinyl acetate and 50 g of azobisdimethylvaleronitrile were charged into the vessel. Then, the polymerization of vinyl chloride was carried out at 56° C for 13-15 hours. After the completion of polymerization, vinyl chloride polymer was taken out. No scale deposition could be observed on the inside walls of the vessel and auxiliary equipment. The metal gloss of the surfaces was still present.

In comparison, in case the polymerization was carried out without being coated with pyrogallol under the same conditions as above, 225 g/m$^2$ of polymer scales were measured to be deposited.

EXAMPLE 4

The surfaces of inner walls of a 1,000 liter stainless steel polymerization vessel were coated with a water solution containing pyrogallol. The amount coated on the surfaces was 1.48 g/m$^2$. Water was removed by drying. Then, the polymerization was conducted under the same conditions as in Example 1. The obtained polymer was was taken out after polymerization. Careful observation showed no polymer scale adhesion on the inner surfaces of the vessel and equipment. The surfaces maintained their metal gloss.

EXAMPLES 5-7

Hydroxyhydroquinone was dissolved in ethanol, with which the inside walls of 1,000 liter stainless steel polymer vessels were coated. Hydroxyhydroquinone was then coated on three polymerization vessels and auxiliary equipment in amounts of 3.7 g/m$^2$, 2.35 g/m$^2$ and 0.13 g/m$^2$, respectively. Ethanol was removed by drying. Then the polymerization of vinyl chloride was carried out under the same conditions as in Example 1. After the polymerization, the polymer was taken out. In each case, no adhesion of polymer scales to the surfaces of the vessel and equipment could be noticed. Each polymerization vessel still had its metal gleam even after the polymerization.

In comparison, where the polymerization was conducted under the same conditions except that no hydroxyhydroquinone was applied, the quantity of polymer scales deposited on the surfaces was found to amount to as much as 225 g/m$^2$.

EXAMPLE 8

The surfaces of the interior walls of a 1,000 liter stainless steel polymerization vessel were coated with a water solution containing hydroxyhydroquinone. 2.38 g/m$^2$ of hydroxyhydroquinone was fixed. After the removal of water by drying, the polymerization of vinyl chloride was carried out as in Example 1. The resulting vinyl chloride polymer was taken out after polymerization was completed. Polymer scale deposition on the inner walls of the vessel and equipment could not be observed. The surfaces were still glossy.

EXAMPLE 9

Pyrogallol was dissolved in ethanol, with which the surfaces of the inner walls of a 1,000 liter stainless steel polymerization vessel were coated. Pyrogallol was thus applied to an amount of 0.60 g/m$^2$.

The removal of ethanol was made by drying. Then, 180 kg of vinyl chloride, 20 kg of vinyl acetate, 500 kg of pure water, 1 kg of partially saponified polyvinyl acetate and 200 g of azobisisobutylonitrile were introduced into the polymerization vessel. The copolymerization of vinyl chloride with vinyl acetate was carried out at 58° C for 10 hours. The copolymer obtained was taken out after the completion of polymerization. No scales were found to be deposited on the surfaces of the inner walls of the vessel and auxiliary equipment. The surfaces were still glossy.

In comparison, the polymerization was performed without pyrogallol being first applied to the surfaces, and scales were found adhered to the walls in an amount of 190 g/m$^2$.

From Example 9, it can be understood that the present invention is also applicable to copolymerization and produces substantially perfect scale prevention.

The foregoing description is illustrative of the principles of this invention. Numerous other variations and modifications thereof would be apparent to the worker skilled in the art. All such variations and modifications are to be considered to be within the spirit and scope of this invention.

What is claimed is:

1. In a method of suspension polymerizing vinyl chloride or a monomer mixture of vinyl chloride as major component and other monomers copolymerizable therewith as minor component, in an aqueous medium, in the presence of a suspension agent and an oil soluble catalyst, the improvement comprising the step of coating the interior surfaces of the polymerization vessel and auxiliary equipment prior to said polymerization with at least one compound selected from the group consisting of hydroxyhydroquinone and pyrogallol.

2. The method of claim 1, wherein said interior surfaces are coated with said compound in amounts within the range of from about 1 mg/m$^2$ to 5 g/m$^2$.

3. The method of claim 1, wherein said compound is applied undiluted or said compound is diluted with a solvent and then applied.

4. The method of claim 3, wherein said solvent is selected from the group consisting of water, methanol, ethanol, isopropanol and mixtures thereof.

5. The method of claim 4, wherein said solvent is water.

6. The method of claim 1, wherein said interior surfaces are coated with said compound by spray method, steeping method or brush coating method.

7. The method of claim 1, wherein said monomeric mixture comprises about 60 to 100% by weight vinyl chloride and about 40 to 0% by weight of at least one other copolymerizable monomer.

8. The method of claim 1, wherein said other monomer copolymerizable with said vinyl chloride is at least one member selected from the group consisting of vinyl acetate, vinyl propionate, methyl vinyl ether, methyl acrylate, methyl methacrylate, maleic acid, fumaric acid, anydrides or esters of maleic acid, or fumaric acid, ethylene, propylene, vinylidene chloride, vinyl bromide, vinyl fluoride and acrylonitrile.

9. The method of claim 1, wherein said oil soluble catalyst is an organic peroxide, an azo-compound or mixture thereof.

10. The method of claim 9, wherein said organic peroxide is selected from the group consisting of dibenzyl peroxide, dilauroyl peroxide, diisopropyl peroxydicarbonate, dioctyl peroxydicarbonate, acetylcyclohexylsufonyl peroxide and mixtures thereof.

11. The method of claim 9, wherein said azo-compound is selected from the group consisting of azobisisobutylonitrile, azobisdimethylvaleronitrile and mixtures thereof.

12. The method of claim 1, wherein said suspension agent is selected from the group consisting of partially saponified polyvinyl acetate, polyacrylic acid, copolymers of maleic anhydride, cellulose derivatives, gelatin and mixture thereof.

* * * * *